US012742633B2

(12) United States Patent
Götlind et al.

(10) Patent No.: US 12,742,633 B2
(45) Date of Patent: Sep. 22, 2026

(54) OPTIMISING VEHICLE MEASUREMENTS

(71) Applicant: VOLVO TRUCK CORPORATION, Gothenburg (SE)

(72) Inventors: Helena Götlind, Hindås (SE); Daniel Johansson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 731 days.

(21) Appl. No.: 18/164,093

(22) Filed: Feb. 3, 2023

(65) Prior Publication Data

US 2023/0243638 A1 Aug. 3, 2023

(30) Foreign Application Priority Data

Feb. 3, 2022 (EP) .................................... 22155032

(51) Int. Cl.
*G01B 11/04* (2006.01)
*G01S 7/48* (2006.01)
*G01S 13/86* (2006.01)
*G01S 17/86* (2020.01)

(52) U.S. Cl.
CPC .......... *G01B 11/043* (2013.01); *G01S 7/4802* (2013.01); *G01S 13/865* (2013.01); *G01S 17/86* (2020.01)

(58) Field of Classification Search
CPC ...... G01B 11/043; G01B 21/02; G01B 21/06; G01S 7/4802; G01S 17/86; G01S 13/865; G01S 13/88; G01S 13/882
See application file for complete search history.

(56) References Cited

U.S. PATENT DOCUMENTS

| | | | |
|---|---|---|---|
| 10,384,612 B2 | 8/2019 | Bochenek | |
| 10,829,152 B2 | 11/2020 | Mayer et al. | |
| 11,014,561 B2 | 5/2021 | Gupta et al. | |
| 12,409,952 B1 * | 9/2025 | Brajovic | G06T 7/0004 |
| 2016/0343176 A1 * | 11/2016 | Ackley | G07B 17/00661 |
| 2017/0337705 A1 * | 11/2017 | Bendall | G01B 11/24 |
| 2019/0195617 A1 * | 6/2019 | Krishnamurthy | G06T 7/62 |
| 2020/0269852 A1 | 8/2020 | Miller et al. | |
| 2021/0229662 A1 | 7/2021 | Ozbilgin | |
| 2021/0232142 A1 | 7/2021 | Mepham et al. | |
| 2023/0162509 A1 * | 5/2023 | DeLizo | G01B 17/00 382/103 |

(Continued)

FOREIGN PATENT DOCUMENTS

DE 102014224541 A1 * 6/2016 ............ G01B 21/02

OTHER PUBLICATIONS

Extended European Search Report in corresponding European Application No. 22155032.0 dated Jul. 27, 2022 (7 pages).

(Continued)

*Primary Examiner* — Michael P LaPage
(74) *Attorney, Agent, or Firm* — Jeffri A. Kaminski; Venable LLP

(57) ABSTRACT

A method of measuring trailer dimensions using a vehicle comprises generating measurement data by repeatedly measuring one or more dimensions of a trailer using a set of one or more sensors of the vehicle, evaluating the accuracy of the measurement data based on a view angle at which each measurement was captured by the vehicle, and determining a subset of the measurements based on their evaluated accuracy to represent the trailer dimensions.

18 Claims, 6 Drawing Sheets

(56) References Cited

U.S. PATENT DOCUMENTS

| | | | | |
|---|---|---|---|---|
| 2024/0005543 | A1* | 1/2024 | Danescu | G05D 1/0094 |
| 2024/0104515 | A1* | 3/2024 | Petrelli | G05D 1/2247 |
| 2024/0302196 | A1* | 9/2024 | Abe | G01B 11/22 |
| 2025/0052892 | A1* | 2/2025 | Fujiwara | E02F 9/26 |

OTHER PUBLICATIONS

European Communication pursuant to Article 94(3) EPC dated Apr. 10, 2025 in corresponding European Patent Application No. 22155032.0, 4 pages.

* cited by examiner

T=T1

φ0
φ1
α0
α1
β1
b1
b2
h1
h2
h3
L1
L2
14
10
12
X1
T=T2

φ2
α2
β2
X2
X3

φ3
α3
β3

OPTIMISING VEHICLE MEASUREMENTS

TECHNICAL FIELD

The present disclosure relates to a method of measuring dimensions of a three-dimensional object such as a trailer using a vehicle and to various related aspects.

In particular, but not exclusively the disclosed technology relates to improving or optimizing the accuracy of measured dimensions of a trailer taken by a vehicle by taking into account the perspective view or aspect of an object when a particular dimensional measurement is made. The measurements may be taken by processing data generated by sensors of the vehicle. For example, vehicle may measure dimensions of a trailer as it is approached by the vehicle along a trailer coupling approach trajectory.

The disclosed methods are particularly useful for vehicles which are automated to some degree, in other words, which have an automated driving system and electronic control unit configured to control operation of the vehicle. Examples of automated vehicles include autonomous, semi-autonomous and remote controlled vehicles.

The disclosed technology will be described mainly with respect to vehicles without limitation to a particular type of vehicle. Such vehicles may include heavy-duty vehicles, such as semi-trailer vehicles and trucks as well as other types of vehicles such as cars and vehicular machines such as agricultural and mining vehicular machines.

BACKGROUND

The disclosed technology seeks to address issues relating to accuracy automated measurements taken by a vehicle as it approaches or navigates around an object such as a trailer. It is known for a vehicle to take measurements of an object using image sensors and light detection and ranging, LIDAR, sensors and the like. However, the accuracy of the sensor data can vary significantly. Relying on a measurement which is insufficiently accurate can lead to various consequences. For example, without using a suitable safety margin, inaccurate measurements of the width and/or height of an object which is then hitched to a vehicle can affect that vehicle's ability to follow a particular route safely if there are width restrictions and/or low-height bridges along the route and the trailer turns out to be wider and/or higher than the allowed widths or heights. If the length of an object such as a trailer is not known sufficiently accurately, then manoeuvres such as turning and reversing may not be safely performed. If a safety margin is used which is too large, however, although the safety may be improved, the additional size increase due to the safety margins used for trailer dimensions may result in a route being followed by a vehicle towing the trailer which is far longer than necessary. It is accordingly desirable to be able to understand how accurate measurements of an object such a trailer which are taken by a vehicle are.

The disclosed technology seeks to optimize measurement accuracy so as to mitigate, obviate, alleviate, or eliminate various issues known in the art which may otherwise occur if measurements are taken which later turn out to not have a sufficient degree of accuracy.

SUMMARY STATEMENTS

Whilst the invention is defined by the accompanying claims, various aspects of the disclosed technology including the claimed technology are set out in this summary section with examples of some preferred embodiments and indications of possible technical benefits.

The disclosed technology generally relates to measuring one or more dimensions of an object such as a trailer using data generated by one or more vehicle sensors. Minimum involvement of a driver is required, for example, the vehicle may be an automated vehicle in some embodiments, such as an autonomous or semi-autonomous or remote controlled vehicle, which uses its front and/or side sensors, for example, image sensors and and/or LIDAR sensors, to detect dimensions of objects in the vicinity of the vehicle.

According to a first aspect of the disclosed technology a method of measuring trailer dimensions using a vehicle is provided, the method comprising the vehicle: generating measurement data by repeatedly measuring one or more dimensions of a detected trailer using a set of one or more sensors of the vehicle, evaluating the accuracy of the measurement data based on a view angle at which each measurement was captured by the vehicle, and determining a subset of the measurements based on their evaluated accuracy to represent the trailer dimensions.

In some embodiments of the first aspect, the vehicle is an autonomous or semi-autonomous vehicle and the trailer is a trailer identified by the vehicle as a trailer to be coupled with, and the method is performed when the autonomous vehicle is on a trailer coupling approach trajectory. In some embodiments, the vehicle is an autonomous self-driving vehicle, and in response to the autonomous self-driving vehicle receiving an identifier for the trailer to be measured by the vehicle, the autonomous self-driving vehicle performs the method autonomously. In some embodiments of the first aspect, in response to the vehicle receiving an identifier for the trailer to be measured, the method further comprises causing measurement guidance to be provided to a driver of the vehicle to measure the identified trailer using the vehicle.

In some embodiments of the first aspect, the measuring is performed using LIDAR or a combination of LIDAR and one or more of the following types of sensor systems on board the vehicle: a camera system, a RADAR system, and an ultrasound system.

In some embodiments of the first aspect, all sides of the trailer are measured.

In some embodiments of the first aspect, the vehicle, responsive to completing a measurement of a dimension of the trailer, performing at least one of: causing presentation of a measurement accuracy of the measurement data on a display;

sending data representing a measurement accuracy of the measurement data to a remote platform; and sending data representing a measurement accuracy of the measurement data to an electronic control unit on-board the vehicle.

In some embodiments of the first aspect, if the measurement accuracy of the measurement is below a threshold, the method repeats at least the measuring, evaluating, determining of the first aspect until the measurement accuracy of the measurement data meets a threshold measurement accuracy condition.

In some embodiments of the first aspect, the vehicle is an autonomous vehicle, and the vehicle travels around the trailer until the measurement accuracy of the measurement data meets the threshold measurement accuracy condition or a measurement termination condition is met.

In some embodiments of the first aspect, evaluating the accuracy of the measurement data of a dimension of the trailer is performed by: determining a first perspective view angle, $\alpha 1$ at which first measurement data of a dimension (D1) of the trailer is obtained; determining a second perspective view angle, $\alpha 2$ at which second measurement data of the dimension (D1) of the trailer is obtained; and determining a median or mean measurement data value for the length of the dimension D within an angle range between the first and second perspective view angles, $\alpha 1$, $\alpha 2$, wherein, based on the median or mean measurement data, a representative trailer length measurement in dimension D1 is obtained by predicting a maximum value of the median or mean trailer length dimension D1 at a predicted max perspective view angle, a max.

In some embodiments of the first aspect, the method further comprises generating an alert and sending the alert to one or more of a vehicle driver, a remote platform, or the vehicle electronic control unit, ECU, indicating one or more of the following: an indication recorded measurement data represents a sub-optimal recording angle; a low measurement data accuracy alert message;

a measured dimension deviates beyond a predetermined value; an indication of an obstruction affecting image analysis of one or more dimensions; an indication to repeat the measurement of one or more of the trailer dimensions; an indication to reposition the vehicle prior to performing a trailer dimension measurement; a data quantity measurement warning for low levels of measurement data; and an indication of one or more measured dimensions or the configuration of the trailer deviating from predetermined dimensional measurement data or configuration data for that trailer.

In some embodiments of the first aspect, the method further comprise adding one or more safety margins to the measured trailer dimensions.

In some embodiments of the first aspect, a safety margin for a measured trailer dimension is dynamically determined based on the determined accuracy of the measurement data for that measured trailer dimension.

According to a second aspect of the disclosed technology, a control system or circuitry (40) for a vehicle (10) having an automated driving system, ADS (22), or an advanced driver assistance system, ADAS, the control system or circuitry (40) comprises: memory (44), one or more processors or processing circuitry (42), and computer-program code which, when loaded from memory (44) and executed by the one or more processors or processing circuitry (42) causes the control system (40) to implement a method according to the first aspect.

According to a third aspect of the disclosed technology a computer program product comprising computer-code which when loaded from memory (44) and executed by one or more processors or processing circuitry (42) of a control system or control circuitry (40) of a vehicle (10) having an automated driving system (60), causes the vehicle to implement a method.

According to a fourth aspect of the disclosed technology, a computer program carrier carrying a computer program according the third aspect is provided, wherein the computer program carrier is one of an electronic signal, optical signal, radio signal or computer-readable storage medium.

According to a fifth aspect of the disclosed technology an automated vehicle (10) comprises a control system or circuitry according to the second aspect.

In some embodiments, the automated vehicle is a heavy-duty automated vehicle configured to perform a method of measuring trailer dimensions according to the first aspect whilst the vehicle is moving along a trailer coupling approach trajectory to the trailer.

The disclosed aspects and embodiments may be combined with each other in any suitable manner which would be apparent to someone of ordinary skill in the art.

BRIEF DESCRIPTION OF THE DRAWINGS

Some embodiments of the disclosed technology are described below with reference to the accompanying drawings which are by way of example only and in which.

DETAILED DESCRIPTION

Figures 1A, 1B, 1C:
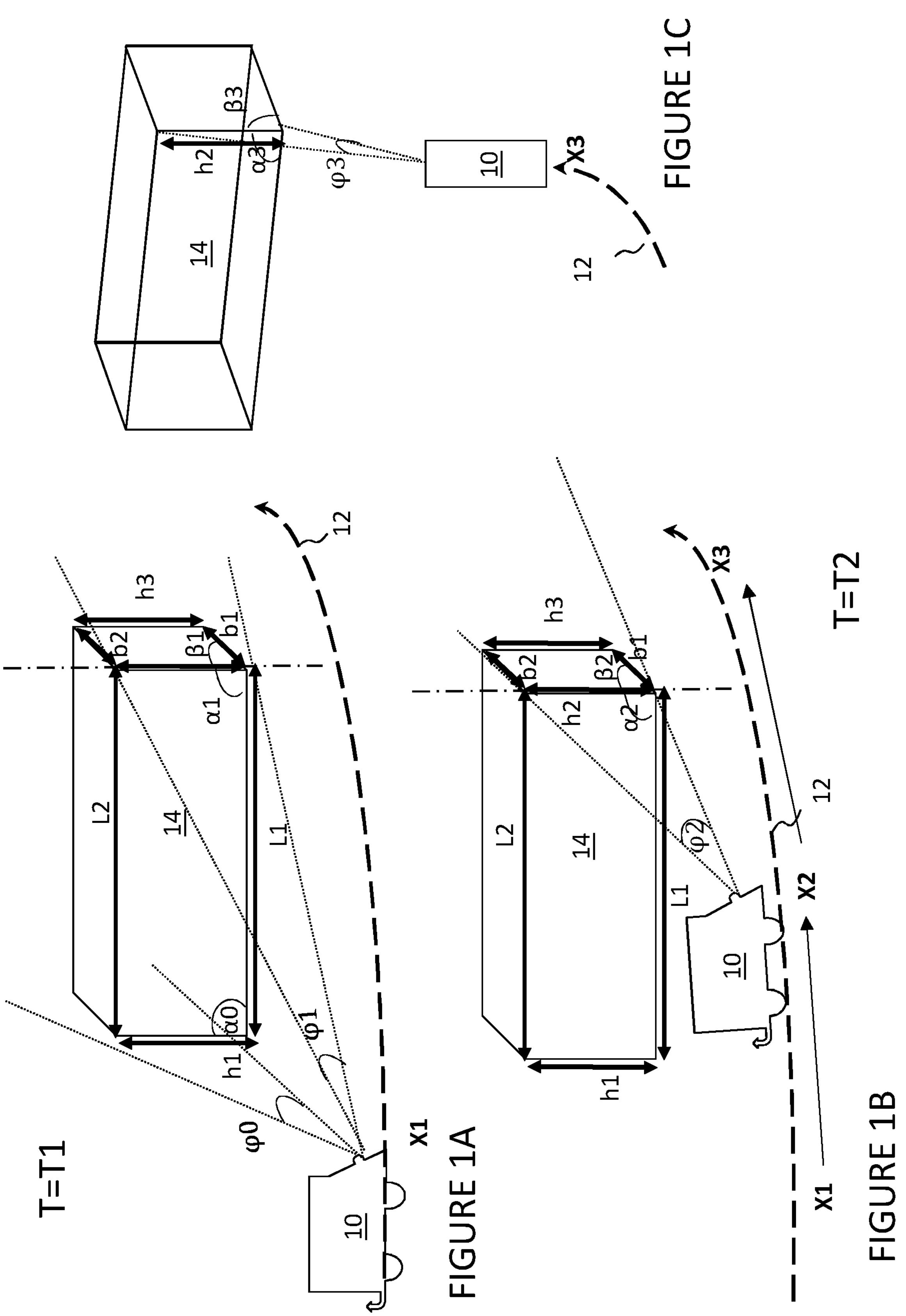
FIG. 1A schematically illustrates a vehicle measuring a trailer at a first point along a trajectory according to some embodiments of the disclosed technology.
FIGS. 1B and 1C schematically illustrate the vehicle of FIG. 1A measuring the trailer at a second and third point further along the trajectory shown in FIG. 1A according to some embodiments of the disclosed technology.

Aspects of the present disclosure will be described more fully hereinafter with reference to the accompanying drawings. The apparatus and method disclosed herein can, however, be realized in many different forms and should not be construed as being limited to the aspects set forth herein. Steps, whether explicitly referred to a such or if implicit, may be re-ordered or omitted if not essential to some of the disclosed embodiments. Like numbers in the drawings refer to like elements throughout.

The terminology used herein is for the purpose of describing particular aspects of the disclosure only, and is not intended to limit the disclosed technology embodiments described herein. As used herein, the singular forms "a", "an" and "the" are intended to include the plural forms as well, unless the context clearly indicates otherwise.

The disclosed technology generally relates to measuring one or two or preferably all three dimensions of a physical object such as a trailer using data generated by one or more vehicle sensors. Minimum involvement of a driver is required in some embodiments, for example, embodiments where the vehicle is an automated vehicle.

An automated vehicle is a vehicle with an automated driving system, ADS or a driver assistance system, ADAS, which may offer some degree of ADS functionality. Unless distinguished herein the term ADS shall be used to refer to both ADS and ADAS types of system. Examples of automated vehicles include, but are not limited to: autonomous vehicles, semi-autonomous vehicles and/or remote controlled vehicles. Some examples of automated vehicles are driven by human operators and/or driven autonomously or semi-autonomously by an ADS on-board the vehicle. Other examples of automated vehicles may be driven remotely by human operators and/or by autonomous systems. A fully autonomous vehicle includes an ADS and a driver (human operator) may not even be present, or they may be present on-board or remotely but not actively driving, such as may be required to fulfil safety requirements during the autonomous driving. A semi-autonomous vehicle includes an ADS but still requires a driver to actively drive the vehicle either on-board or remotely. In a semi-autonomous vehicle, certain actions may be performed autonomously, for example trajectory (steering) is often controlled automatically, but speed may be controlled manually. As another example, in a semi-autonomous vehicle, only certain driving activities can be fully performed automatically, for example an autonomous trailer connect system, reverse assistance system may be provided.

If the automated vehicle includes an ADS in the form of an ADAS then a driver is always present. For example, an automated vehicle with an ADAS may also include a system displaying a proposed trajectory and/or action to the driver of the vehicle. Automated vehicles which have a remote driver, may have different degrees of automation ranging from fully autonomous, semi- or manual functionalities. An ADS (or ADAS) may use one or more sources of sensor data to make tactical decisions about the operation of the automated vehicle. For example, object detections may be determined by the ADS (or ADAS) based on sensor data and used to provide instructions to an electronic control unit of the vehicle which may then use the data to perform a method of measuring a three-dimensional object according to the disclosed technology. The ADS (or an ADAS) according to the disclosed technology uses sensor data related to object and edge detections to make measurements of a physical object. Such sensor data may be generated by sensors capable of measuring depth or distance to a detected object. Examples of suitable sensors can be found on the front of automated vehicles, in other words, which face the forwards driving direction of the vehicle.

The sensor data may be generated as a stream of raw data which the ADS (or ADAS) processes to determined object and edge detections, and which is further processed according to the disclosed technology to measure one or more dimensional lengths of a detected object. Techniques to determine, for example, a dimensional length of a detected object are well-known in the art, and may, for example, be based on determining a distance between detected edges of an object.

Examples of a suitable sensor set comprising one or more sensors which can generate data which the disclosed technology may use to generate measurements of the dimensional lengths, for example, the height, width, and length, of a physical object such a trailer may comprise a sensor set which includes one or more front mounted image sensors such as cameras, including depth cameras, and/or one or more ultrasound and/or radio detection and ranging, RADAR, and/or light detection and ranging, LIDAR, sensors. The sensor data from one or more of the sensors may be fused in some embodiments of the invention.

The measuring of one or two or preferably all three dimensions of a physical object such as a trailer using data generated by one or more vehicle sensors is achieved by a vehicle performing an embodiment of the disclosed method of measuring an object's dimensions, for example, of measuring all three dimensions of a physical stationary object such as a trailer, using sensor data generated by a set of sensors provided on an vehicle according to the disclosed technology. The sensor data is processed by a suitably configured automated driving system, ADS, or ADAS, of the vehicle to generate measurement data. A vehicle with an ADS (or an ADAS) is also referred to herein as an automated vehicle.

According to some embodiments of the disclosed technology an ADS or ADAS of an automated vehicle is configured to process sensor data received to automatically measure one or two but preferably all three dimensions of an object, such as a trailer whilst it approaches the object. This may involve the vehicle following a trajectory around two or more sides of the vehicle, if the width or depth of the vehicle as well as its length is to be measured.

One example use of the disclosed technology enables an automated vehicle which is following a trailer coupling approach trajectory to automatically measure the size of the trailer from a plurality of different sides of the trailer. The method involves the vehicle taking multiple measurements automatically as it approaches the trailer. The multiple measurements are generated by repeatedly measuring each individual dimensional length of the trailer. In other words, the vehicle takes multiple measurements of each of the trailer height, the trailer width, and the trailer length in some embodiments using a set of one or more sensors of a vehicle. The multiple measurements taken of each measured dimensional length are each evaluated for accuracy dynamically, in other words, the accuracy of the measurements is assessed whilst the measurements are being taken in some embodiments.

In some embodiments, the sensor data is evaluated for accuracy based on a view angle at which each measurement of a dimensional length of an object was captured by the vehicle, for example, the vehicles width, height, and length. The view angle is the angle of perspective at which an object or edge is detected, it is measured at the object. For a right-angled corner vertex of an object, all three edges should join at 90 degrees. However, the perspective view of the object will reduce one or more or all of the perceived angles where the edges join. It is possible in some situations that the perceived angle will be larger than 90 degrees, for example, the far left corner of FIG. 1C described later below, and depending on how an object is placed, the perceived angle could be up to 180 degrees.

The accuracy of a dimensional length measurement is defined here as the error between the true value of a vehicles dimensional length and the measurement determined by the ADS based on the sensor data. This accuracy will be dependent on various factors including noise levels and external interference reduction parameters as well as the view angle. For example, the accuracy of a dimensional length measurement may also be dependent at least in part on the sensor resolution, where resolution is defined as the minimum variance between two measurements, which is generally less than the actual accuracy of the sensor. The accuracy of a dimensional length measurement may be also dependent on the sensor sensitivity, which is the minimum signal value of an object or edge detection which the sensor can detected or measured. The dynamic range of a sensor may also affect the minimum and maximum values that the sensor can accurately detect. The number of continuous measurements of a dimensional length of an object which a vehicle can take whilst approaching the object may also be affected by the refresh rate of the sensor and the frequency of the measurement bandwidth with time.

FIG. 1A schematically illustrates an example embodiment of the disclosed technology where an automated vehicle 10 performs a method of measuring one or more dimensions of an object 14, shown in FIG. 1A as a trailer 14.

It will be apparent to anyone of ordinary skill in the art that the illustrated positions, poses, perspective (at the object) and observational (at the vehicle) angles shown in in FIG. 1A and the other figures accompanying this description are for illustrative purposes only and may not be proportionate or scaled to reflect what would be the actual positions, poses and observational and perspective angles of a measured object or a measuring vehicle.

As shown in FIG. 1, when the vehicle 10 reaches point X1 along the trajectory 12, it takes a measurement of the height h1 using a method of measuring one or more dimensions of an object according to the disclosed technology. In some embodiments, the trajectory is a trailer-coupling approach trajectory 12 the method is performed whilst the vehicle 10 is following the trailer-coupling approach trajectory 12 as it approaches the trailer 14.

As shown in FIG. 1A, as the vehicle 10 follows the trajectory 12, its front sensors are capable of making multiple measurements of one or more dimensions of trailer 14. For example, a first measurement at point X1 on the trajectory 12 may be of the height h1 of the trailer which is determined when the vehicle is viewing the vertex formed by the two edges h1 and L1 with a perspective view angle $\alpha$0. As shown in FIG. 1A, at location X1 the trailer also has visibility of the height h2 at the far end of the trailer, which is viewed with a different perspective view angle $\alpha$1.

Later, at position X2 along trajectory 12 the vehicle 10 can re-evaluate the height measurement h2 based on additional sensor data received as the vehicle moves along the trajectory. For example, in FIG. 1B at point X2 on the trajectory 12, the vehicle is measuring the trailer height h2 with view angle $\alpha$2 between the edge parallel to trailer height h2 and the trailer length edge L2. The height h2 as shown in FIG. 1B is shown from a perspective where it forms a perspective view angle $\beta$2 with the base width edge b1.

The vehicle takes repeated measurements over a range of different observational angles $\phi$ from the vehicle to two vertices of the object, each vertex of the object being associated with different perspective view angles $\alpha$, $\beta$ of the adjacent planar sides of the object as the vehicle moves along a trajectory. As the vehicle moves along the trajectory and its perspective view of the object changes. The measurements taken by the vehicle of the different perspective view angles are stored so that they can be processed by the measurements methods of the disclosed technology to determine an optimal likely measurement accuracy of one or more measurements taken of the distance between the two vertices of the object. The dimensional length of the trailer's height, is shown in FIG. 1A as h1, is viewed with a perspective angle $\alpha$0 at the object when viewed with observational angle span $\phi$0 at the vehicle and the trailer's height at the far end from the measuring vehicle is shown as being measured as h2 when taken over an observational angle span $\phi$1 which is associated with a perspective view angle $\alpha$1. In other words, at a first point in time T=T1, the height h which should be the same as both h1 and h2 ideally of the trailer 14 can be determined based on detected data taken at view angles $\alpha$0, $\alpha$1 and over a range of view angle spans $\phi$0, $\phi$1.

FIG. 1B shows at a later point in time T=T2, the vehicle 10 has moved to location X2 on trajectory 12. At this point, the vehicle detects the trailer height as h1 using data detected by the vehicle sensors at a vertex which now has perspective view angles $\alpha$2,$\beta$2. The height h1 is taken over an observational view angle span $\phi$2 subtended at the vehicle.

FIG. 1C shows at a later point in time T=T3 the perspective view angles $\alpha$3,$\beta$3 of the same vertex when viewed with observational view angle span $\phi$3, which are associated with h2. Earlier, however, h2 was measured by the vehicle when it had observational view angle span $\phi$2 in association with the perspective view angles $\alpha$2,$\beta$2 as shown in FIG. 1B.

It is possible to accordingly take the same measurement, e.g. h1 (or h2) multiple times at multiple different view angles in some embodiments. Also, in some embodiments, for example, if a trailer is known to have a certain configuration, such that h1 should be the same as h2 or h3, i.e., if the trailer has a consistent height h, it is possible to compare these three different measurements which were taken at different observational view angles $\phi$. In some embodiments, a subset of the set of all measurements generated for each dimensional length, e.g. each of the dimensional lengths of the trailer sides, based on their evaluated accuracy is determined. The measurement data in the data subset can then be averaged for example, and taken as the accurate measurements which represent the trailer dimensions.

In some embodiments, the vehicle first identifies a trailer to be measured. In some embodiments, the vehicle measures the one or more dimensions of the trailer whilst the vehicle is following a trailer coupling approach trajectory.

In some embodiments, instead or in addition to evaluating the accuracy of measurement data based on the perspective view angle $\alpha$ or $\beta$ of the vertex or edge at which a measurement of a dimensional length is captured by the vehicle, the accuracy is evaluated based on a span of observational view angles, each associated with perspective view angles, so that multiple samples of $\alpha$ or $\beta$, are obtained over a range of different observational angles $\phi$ along the trajectory a vehicle is following. The object or edge detections at each observational angle $\phi$ location along the trajectory are captured by the set of one or more sensors on the vehicle and are provided as a sensor data set to generate the measurement data of the one or more dimensions of the trailer.

An automated vehicle may repeatedly measure object dimensions using a method according to an embodiment of the disclosed technology whilst following an approach trajectory to the object being measured. This allows the accuracy of the measurements to be automatically optimized as the object is being measured.

The vehicle generates measurement data by measuring one or more dimensions of an object using a set of one or more object-detecting sensors of the vehicle, such as imaging, hydrophone, LIDAR, and/or RADAR sensors which are known to be used by vehicles to detect objects in the vicinity of the vehicle. The measurements of detected objects are repeatedly generated using object-level data and/or image data captured as the vehicle follows a trajectory as it approaches and/or navigates at least partially around the object and the vehicle's perspective view of the object changes.

The generated measurement data is associated with one or more perspective view angles, also referred to herein as view angles or as angles of perspective, at which the object and/or image data was captured by the front-facing sensors of the vehicle. In other words, the source data may be associated with the direction of an edge of the object as it is viewed by a sensor relative to the trajectory of the vehicle and/or the front facing position of the vehicle. Measurement data may in addition, or instead, use data generated by side-facing sensors of the vehicle in some embodiments providing these can be adjusted to taken into account the different perspective view of the object being measured.

The accuracy of the measurement data is evaluated based on the detected view angles of the edges of the object. In some embodiments, it may be possible to instead or in addition to evaluate the accuracy of the data based on one or more vehicle observational view angle spans such as $\phi$0, $\phi$1, $\phi$2, $\phi$3 as shown in FIGS. 1A to 1C.

By taking multiple measurements of each dimensional length of an object, a subset of the measurements based on their evaluated accuracy can be generated which meet one or more accuracy criteria. For example, an accuracy criterion may require the data used to generate the measurements to have been captured by front facing sensors above a first perspective (view) angle $\alpha$ and/or below one or more second perspective (view) $\beta$ from the forwards facing direction of the vehicle (see FIGS. 1A, 1B and 1C).

In this way, an object such as, for example, a trailer can be measured by a nearby vehicle in an autonomous manner with the accuracy of the measurements being automatically available. The vehicle may be an automated heavy-duty vehicle such as a truck or semi-trailer or tractor or the like in some embodiments. It is also possible for the invention to be used by a vehicle which is loading goods where the dimensions of the goods may be determined prior to attempting to place the goods in a particular location. For example, a fork-lift truck or the like may use the disclosed technology to measure the size of a crate prior to placing the crate in a particular location, e.g. on a shelf, in a warehouse.

Figure 2:
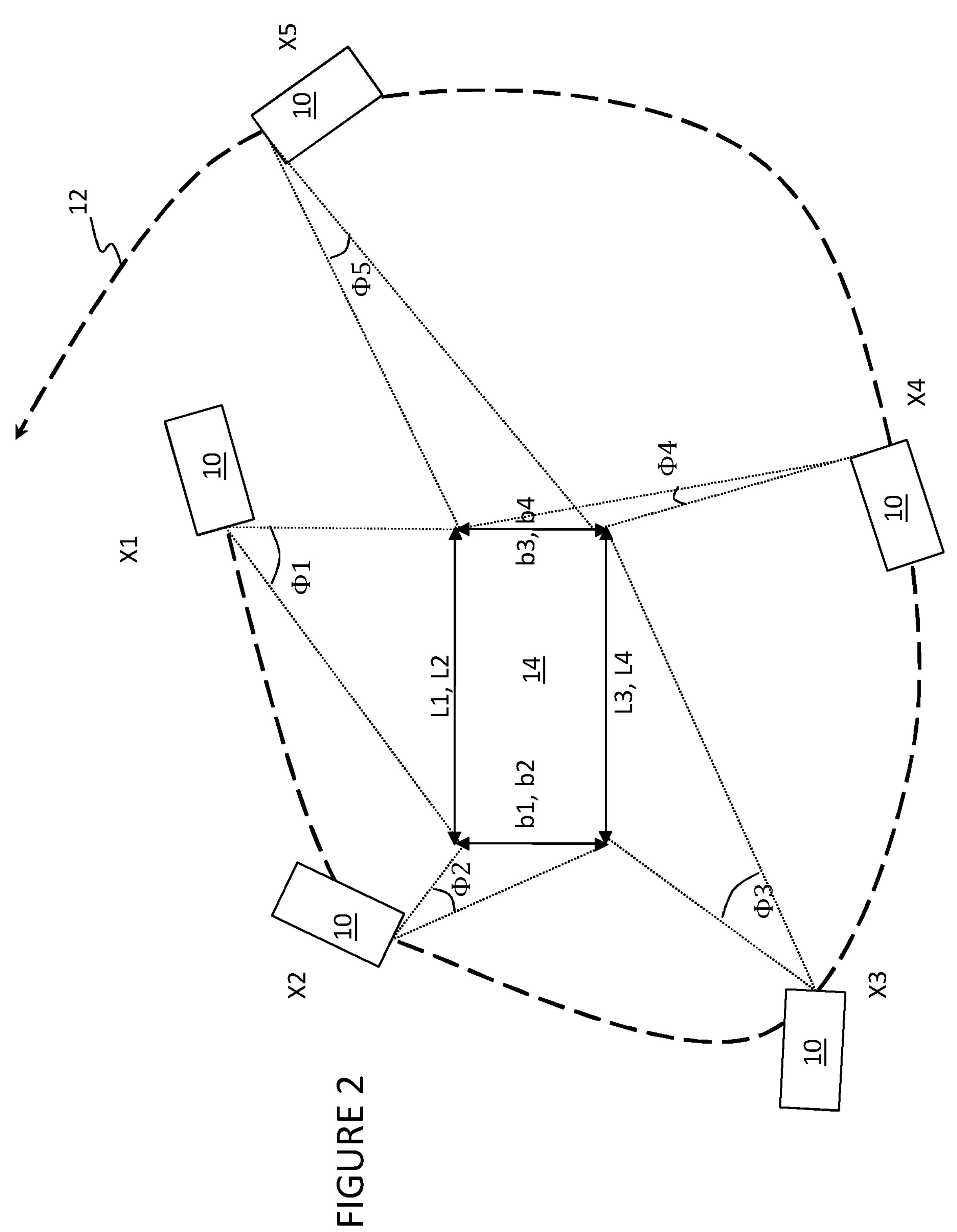
FIG. 2 schematically illustrates an overhead view of a vehicle performing a method of measuring dimensions of a three-dimensional object such as a trailer according to some embodiments of the disclosed technology.

FIG. 2 shows an overhead view of how a vehicle 10 may make multiple measurements 10 as it follow trajectory 12 around an object such as a trailer 14. The multiple measurements may include multiple measurements of the same dimensional length of the vehicle (see the measurement of the trailer width b3 taken at points X4 and X5) in some embodiments of the disclosed technology and/or of different take a number of repeated measurements of one or more different dimensional lengths from different sides of the trailer as it moves along. For example, L1 may be the same lower length of a trailer as L3 if the trailer is a regular rectangle as shown in FIG. 2, in which case the measured lengths for L1 and L3 may both be used when determining the accuracy of the measurements of L1 and L3 in some embodiments. In other words, the same dimensional length may be measured from both sides of an object such as trailer where there is an expectation that the sides will have the same length.

As shown in FIG. 2, the trajectory followed by the vehicle 10 as it measures the trailer size results in a variety of recorded viewing angles being associated with measurements taken by the vehicle as it travels along the trajectory. In some embodiments, the trajectory is a trailer approach trajectory that the vehicle is configured to follow prior to coupling with the trailer. As the vehicle 10 follows the trajectory, it evaluates the sensor data and selects the most accurate data using an embodiment of the disclosed method of measuring one or more dimensions of a trailer which optimizes the measurement accuracy by taking repeated measurements of each dimensional length.

In FIG. 2, the vehicle 10 first starts to take measurements at position X1 on trajectory 12 as it approaches trailer 14. The perspective view angles at which the trailer length L and width b are measured as shown in FIG. 2 over span a range of view angle $\Phi$1 when the vehicle is at position X1 for the measurement of the trailer lengths L1 and L2, a view angle range $\Phi$2 for the measurement of widths b1, b2 when the vehicle is at X2, $\Phi$2 at when the vehicle is at X3 measuring L3, and L4. The span of view angles for measuring b3 and b4 is $\Phi$4 when the vehicle is at X4, and the span of view angles is $\Phi$5 for taking the same b3 and b4 measurements when the vehicle is at X5. Each dimensional length measurement however will be at an individual perspective view angle $\alpha$ (and may also include a perspective view angle $\beta$ of a second edge if taken at a vertex of the trailer). For example, a measurement of L1 may be taken at view angle $\alpha$. A measurement of b2 may be taken at view angle $\beta$. Each perspective view angle is measured at the object.

In some embodiments, the vehicle 10 will receive some object-identifying information, for example, map (GPS) data so that the relevant object can be located prior to starting measurements at X1. This object identifying information may be provided remotely or via a short-range wireless communication directly with the object to be measured, for example, by a trailer-to-vehicle communication link if the object is a trailer. Alternatively, an object to be measured may be identified by a vehicle operator inputting an indication of an object such as a trailer to be measured by the vehicle.

Advantageously, in some embodiments, the measurement information may be shown in real-time, for example, provided on a display visible to a driver or operator of the vehicle, or shared or send over a network to a remote platform, or provided to the vehicles electronic control unit, ECU.

The measurement accuracy may also take into account the speed and trajectory of the vehicle as it approaches the trailer and takes measurements of the trailer.

As shown in FIGS. 1A to 1C and 2, the disclosed methods may optimize the measurement of trailer dimensions by selecting the most accurate measurement data based on determined vehicle observational angle span ranges $\Phi$, where the span is the range of observational angle spans $\phi$ measured at the vehicle of the perspective view angles $\alpha$ and $\beta$ as measured at the object. In other words, a range of perspective angles are obtained when continuously measuring the dimensions and these multiple samples of the measured perspective view angles are paired with the measured dimensions.

In some embodiments, measurement data is selected based on a median or mean value of the perspective view angle as calculated within an angle span range $\phi$ or $\Phi$, where the data from the closest angle to 90 degrees is selected as the max angle, i.e. length value (L1) at the recorded projected max angle ($\alpha$) and the width value (b1) at projected max ($\beta$) or a combination of above. In some embodiments, the max angle is the value closed to 90 degrees because, as mentioned previously, the perspective viewing angle as measured at the object may be up to 180 degrees, and it is when the perspective viewing angle is at 90 degrees that the most accurate measurement of the dimension will be obtained.

In some embodiments, the dimension estimate is determined based on a weighed mean value of the perspective angle, where each dimension sample is weighed with the angle data quality condition at that sample.

In some embodiments, the angle data quality condition comprises a large number in the case of a good measurement, and a low value of a poor measurement. For example, in some embodiments the angle data quality condition can be given as follows:

$$\text{Quality condition} = 1 - \text{abs}(90 - a0)/90$$

This would be a value in the range [0, 1], where 0 is very poor quality and 1 is very good quality.

In some embodiments, however, the angle data quality condition of a sample does not have to be a linear condition, as in some embodiments another quality condition could be used, for example, an angle quality condition based on:

$$\text{Quality condition} = 1 - \text{abs}(90 - a0)\hat{\ }2/90\hat{\ }2$$

In this case, the dimension estimate with a weighed mean could then be formulated using q1,2,3 . . . =quality condition and d1,2,3 . . . =measurement of dimension so that the weighted mean is expressed by:

$$\text{weighed mean} = (d1 * q1 + d2 * q2 + d3 * q3 + \ldots)/(q1 + q2 + q3 + \ldots) \ldots$$

As shown in FIG. 2, the vehicle 10 makes repeated measurements of length L starting with measurements of the lower length of the trailer L1 and the upper length of the trailer L2 which over the vehicle observational view angle range Φ1 at position X1 on trajectory 12. The observational view angle range Φ1 represents the angle subtended at the vehicle of the range of viewing positions of the two endpoints of the dimensional length being measured, e.g. length L at time T=T1 when the vehicle 10 is at position X1. Using geometric analysis, Φ1 may be obtained from α2–α1 where α1 is the perspective view angle taken at X1 and α2 for example is the perspective view angle taken at a later point (or vice versa). As the vehicle progresses along the trajectory, at time T-T2, the same length L may be measured, but with different vehicle observational view angles of each of the two endpoints. These result in a different view span angle Φ. Repeating the measurements of L as the vehicle moves along trajectory 12 will result in a number of measurement samples of that dimensional length of the trailer each associated with different perspective view angles Φ1. These can be assessed to see if they meet accuracy criteria, for example, is the variation in measurement clustered around a median value, and if so, measures which are more than a certain amount from the medium value may be ignored or rejected.

As the vehicle moves on, additional measurements can be made of other sides of the trailer, for example, at position X2 at a later point in time T=T2, the vehicle may be taking measurements of the trailer width b which are made over a vehicle observational view angle range Φ2, for example, measurements may be made of the upper and lower widths b1 and b2. These measurements may be captured over a range of viewing angles as the vehicle moves along the trajectory depending on the vehicle pose relative to the side of the trailer being measured.

At position X3 on the trajectory, the vehicle 10 is shown making measurements of lower length L3 and upper length L4 over a vehicle observational viewing angle range Φ3. For a regular rectangular volume object such as a trailer, the lengths L3 and L4 should be the same as those for L1 and L2, and in some embodiments the median values for one side of the trailer 14 may be based on measurements taken from opposite sides the trailer.

At position X4 on the trajectory, the vehicle 10 is shown making a measurements of lower width b3 and upper width b4 of trailer 14 over a very narrow observational viewing angle range Φ4. Such a narrow viewing angle span is more likely to result in inaccurate distance measurement of the dimensional lengths of the trailer widths b3 and b4 than say, the measurements made later on the trajectory by the vehicle when it is at position X5. At position X5 on the trajectory 12, the vehicle 10 has a pose relative to the trailer width which allows it to make measurements of lower width b3 and upper width b4 which span a bigger viewing angle range Φ5.

In the example embodiment shown in FIG. 2, the dimensions of b3 and b4 made at position X5 are likely to be more accurate than those made at position X4. If the measurements of b3 and b4 are not associated with a viewing angle span however, there would be no way of knowing if they are accurate. For example, even if the measurements made at X4 are repeated at X5, there may be no way of knowing which is the more accurate unless the viewing angle is also captured.

In some embodiments, optionally warnings when a measurement is not likely to be sufficiently accurate are sent to an operator of the vehicle, which may be a driver, or to a remote cloud-based platform or server, or provided to the vehicles ECU. Instead or in addition, the recorded measurement data may be tagged to flag if it was captured at a sub-optimal view recording angle. For example, if the recorded measurement data is associated with a viewing angle span which is less optimal for accurate determination of a dimensional length (for example, a length b1 or L1 as shown in FIG. 1 or 2), in other words, if b1 or L1 is measured at a an angle (α or β) where either α or β below a predetermined value, a warning is sent that L1 or B1 value has low accuracy.

Other situations where a warning or alert may sent include if h1, h2 and/or h3 deviates beyond a predetermined extent, if bland b2 or L1 and L2 deviates beyond a predetermined extent.

In some embodiments, if image analysis indicates that a value of one or more of the dimensional lengths, L, b, or H of an object cannot be determined due to hindrance of objects/limitation of sensors, then an alert or warning message is generated.

The alert or warning message may be presented on a display and/or provided as an audible message or alert tone and/or sent to the vehicle's ADS/ECU so that additional measurements are made to improve the measurement accuracy. In some embodiments, the vehicle may be configured to continue driving along a trajectory around the trailer until accurate data has been concluded.

For example, a warning of potential low accuracy measurement data or a similar alert or warning message may be generated if measured dimensions along a particular dimensional length deviate beyond a predetermined extent. Another example of an alert or warning message which may be generated after taking a measurement which is assessed as being potentially inaccurate may warn a vehicle operator (remote or the driver, or the ECU), that the image analysis which provided the dimensions was adjusted to take into account a potential view obstruction.

In some embodiments, these warnings may trigger the automatic re-positioning of vehicle along the trajectory, in other words, so that the sensors of the vehicle which are used to take the measurements are oriented more towards the side of the object (i.e. the trailer) being measured, before additional data is collected to generate measurements in some embodiments.

An alert may be generated in some embodiments if too little data has been recorded, for example, if only one measurement at X1 was taken of L1 on the trajectory shown in FIG. 2 rather than say 10 measurements every second.

Another example of an alert which may be generated is if measured data (size/shape) deviates from predetermined data of the trailer as defined in the mission or as a pre-set. For example, as mentioned above if the trailer is essentially a rectangular box, if the dimensions of L3 differed by more than say 20% from the dimensions of L1, L2 and L4 an alert could be generated. If L1, B1 and H1 deviates from predetermined data, then in some embodiments, the measurements may be overwritten so that the vehicle is controlled as if the size and shape of the trailer is as defined in the mission/as defined in pre-set or default dimensional values.

Some examples of the disclosed technology optionally add safety margins to dimensions which may be fixed, or, in some embodiments, dynamically adjusted based on the current accuracy estimate of measurement. For example, a percentage value of a maximum length value measured may be taken as a safety margin in some embodiments or alternatively, a percentage of a mean or median of the measurements of a particular dimension may be used. A safety margin may also be adjusted based on the distance from the object being measured, i.e. the distance of the trailer to the vehicle measuring it, and/or be adapted based on the number of recorded values of a particular dimension, for example, a larger safety margin may be used if only one or two measurement of a particular dimensional length are taken than if 10 or 20 measurements are taken.

Depending on the level of likely accuracy of the measurements and/or based on the safety margins determined based on the likely level of accuracy, in other words, the likely level of reliability of measurements taken of a trailer by a vehicle which is to couple to the trailer and haul it, a river strategy based on the dimensions of the trailer, such as speed and route can be more safely adjusted.

Figure 3A:
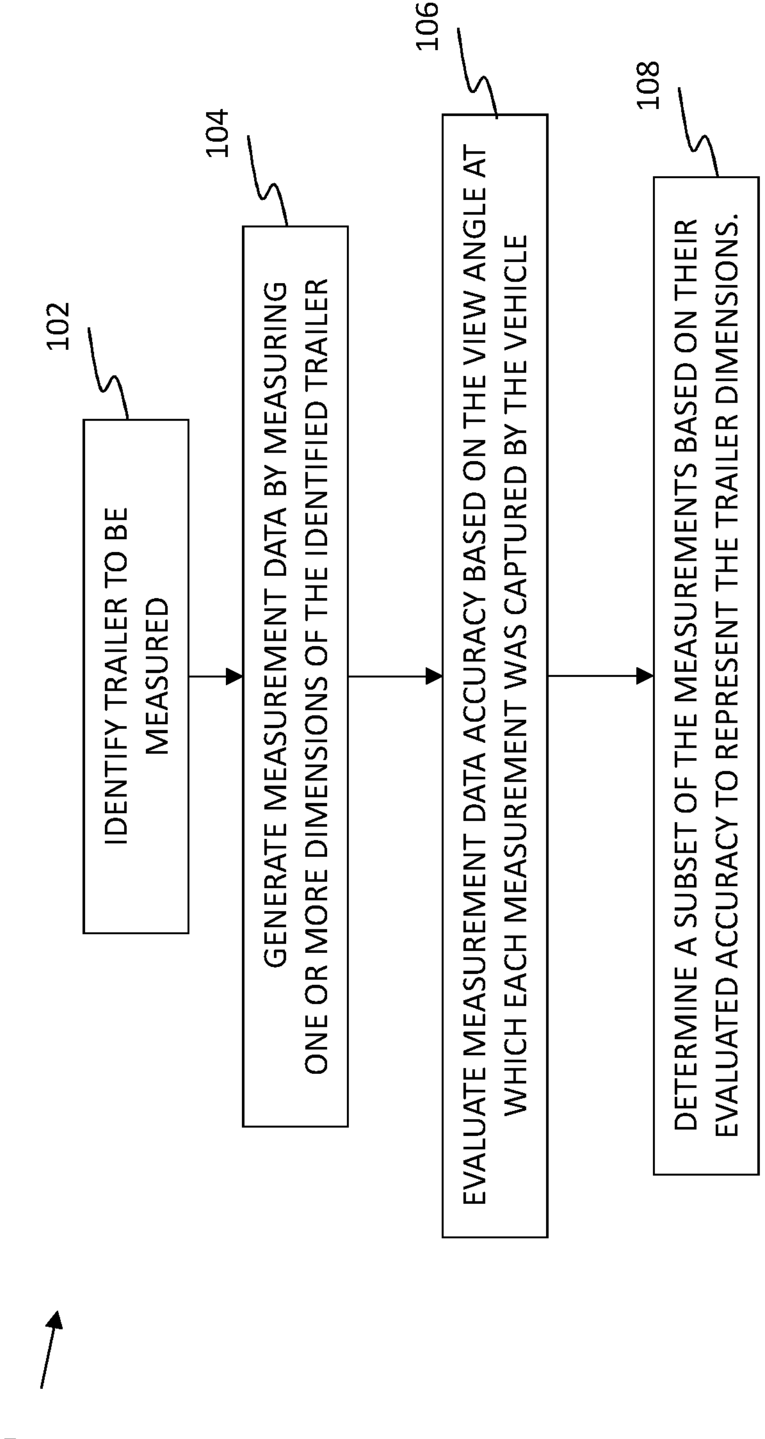
FIG. 3A schematically illustrates steps in a method of measuring dimensions of a three-dimensional object such as a trailer according to some embodiments of the disclosed technology.

FIG. 3A shows schematically an example of a method 100 according to the disclosed technology which is performed by a vehicle, for example, the vehicle 10 shown in FIGS. 1 and 2, in order to check if necessary improve the accuracy of the height measurements, h1, h2, and h3 (as well as the width measurements L1, L2 and depth measurements b1, b2 taken by the vehicle 10 as it approaches an object such a trailer.

As shown in FIG. 3A, vehicle 10 performs a method of measuring trailer dimensions using a vehicle, for example, a method according to the first aspect of the disclosed technology. In some embodiments, the method comprises the vehicle 10 identifying a trailer 14 to be measured, shown in FIG. 3A as step 102, generating measurement data by, repeatedly, measuring one or more dimensions of the identified trailer 14 using a set of one or more sensors of the vehicle 10, shown as step 104 in FIG. 3A, evaluating the accuracy of the measurement data based on a view angle at which each measurement was captured by the vehicle, shown as step 106, and determining a subset of the measurements based on their evaluated accuracy to represent the trailer dimensions, shown as step 108.

The method 100 may be performed by the vehicle 10 when the vehicle 10 is on a trailer coupling approach trajectory 12. Such a trajectory may be followed in some embodiments by an automated vehicle performing the method, for example, by a vehicle is an autonomous or semi-autonomous vehicle or by a remote-controlled vehicle.

Advantageously, the method reduces the likelihood of measurements being taken which are not sufficiently accurate to be relied upon for subsequent route-planning and navigation operations by an automated driving system of the vehicle.

Some embodiments of the disclosed technology relate to measuring trailer dimensions by use of vehicle sensors where minimum involvement of a driver is required.

The sensors of the vehicle capture object-level data and/or imaging sensor data in the form of one or more data streams. The sensor data streams are then processed by the automated driving system, ADS, (which may be an ADAS in some embodiments) of the vehicle in order to implement the disclosed technology.

Examples of vehicles which have an automated driving system include automated vehicles such as an autonomous or semi-autonomous or remote controlled vehicles and/or vehicles which are otherwise capable of automatic operation.

The vehicle may be any suitable vehicle with an ADS or ADAS configured to perform an embodiment of method 100 as shown in FIG. 3A, for example, the vehicle may be an automated vehicle capable of coupling or hitching to the trailer being measured. Examples of automated vehicles which may perform a method 100 including self-driving heavy-duty vehicles such as tractors and trucks.

The measurements may be taken using LIDAR data or a combination of LIDAR data and data from one or more of the following types of sensor systems on board the vehicle: a camera system, a RADAR system, and an ultrasound system.

The sensors used to determine one or more dimensions of an object such as a trailer in the vicinity of the vehicle may generate multiple data streams for each type of sensor data, which are each processed separately by an ADS or ADAS of a vehicle in some embodiments. Alternatively, in some embodiments, different types of sensor data may be fused into a single sensor stream of data before being processed to generate measurement data in other embodiments of the disclosed technology.

A vehicle with an ADS or an ADAS may be configured to perform the method on the vehicle production line or the vehicle may be configured to perform the method by installing additional software after the vehicle has left the production line, for example, an over-the-air software update may be downloaded to the vehicle which, once executed, provides the vehicle with the capability to perform a method according to the first aspect.

In some embodiments, the vehicle identifies the trailer by receiving a notification indicating the trailer to be measured. The notification may come from a remote office, for example, a fleet back office, in some embodiments, or from a driver, or be captured by the vehicle sensors, for example, a tag placed on a trailer may be recognised by the vehicle and/or the vehicle may recognise a human is pointing to a particular trailer in some embodiments.

In some embodiments, for example, if the vehicle is an autonomous self-driving vehicle, in response to the autonomous self-driving vehicle receiving an identifier for the trailer to be measured by the vehicle, the autonomous self-driving vehicle performs the method autonomously.

In response to the vehicle receiving an identifier for the trailer to be measured, the method further comprises the vehicle providing measurement guidance to a driver of the vehicle in some embodiments. Alternatively, the trajectory to be followed by the vehicle may be updated responsive to receiving an identifier for a trailer to be measured.

In some embodiments, an indication of the evaluated accuracy of the measurements can be presented to an operator of the vehicle, for example, to a driver in the vehicle or a remote operator. This technical information relating to the accuracy of the measurements taken which would not otherwise be available when making a measurement allows a measurement to be retaken if the level of accuracy is below a threshold in some embodiments. It also allows for an automated vehicle's trajectory to be modified to improve the accuracy of object dimension measurements in some embodiments.

The sensors generate data which is then processed by the internal processing system of the vehicle, for example, by the vehicles automated driving system, to determine measurements of one or more dimensions of any detected objects and/or their distance from the vehicle. Examples of vehicles which are automated vehicles capable of making measurements of objects include self-driving heavy-duty vehicles such as tractors and trucks. Such vehicles are often provided with front sensors which can be used to determine one or more dimensions of an object in the vicinity of the vehicle. For example, the front sensors of the vehicle may be used to determine the length, width and/or height of an object using sensor data in some embodiments of the disclosed technology.

The sensed data may include image data as well as point data from light detection and ranging sensors, or radio sensors. In some embodiments of the disclosed technology, the vehicle's front-facing sensors are used to determine the size of a trailer as the vehicle approaches the trailer on a particular trajectory. As the vehicle moves along the trajectory, different sides of the trailer can be measured. In some embodiments, measurements are taken from all sides of the trailer.

In some embodiments, responsive to completing a measurement of a dimension of the trailer, the vehicle causes presentation of a measurement accuracy of the measurement data on a display. In some embodiments, instead or in addition, the vehicle sends data representing a measurement accuracy of the measurement data to a remote platform, for example to a site office or a fleet server for a site. In some embodiments, instead or in addition, the vehicle sends data representing a measurement accuracy of the measurement data to an electronic control unit on-board the vehicle.

In some embodiments, if the measurement accuracy of the measurement is below a threshold, the measurements are repeatedly taken until the measurement accuracy of the measurement data meets a threshold measurement accuracy condition. For example, a vehicle may follow a trajectory several times around the object it is measuring.

In some embodiments, if the vehicle is an autonomous vehicle, the vehicle may travel once or more than once around the trailer until the measurement accuracy of the measurement data meets the threshold measurement accuracy condition or a measurement termination condition is met.

In some embodiments, evaluating the accuracy of the measurement data of a dimension of an object such as a trailer is performed by determining a first viewing angle, $\alpha 1$ at which first measurement data of a dimension (D1) of the trailer is obtained, determining a second viewing angle, $\alpha 2$ at which second measurement data of the dimension (D1) of the trailer is obtained, and determining a median or mean measurement data value for the length of the dimension D within an angle range between the first and second viewing angles, $\alpha 1$, $\alpha 2$. Based on the median or mean measurement data, a representative trailer length measurement in dimension D1 is obtained by predicting a maximum value of the median or mean trailer length dimension D1 at a predicted max viewing angle, $\alpha$max.

In some embodiments, the vehicle performs a method according to an embodiment of the first aspect where the method further comprises generating an alert and sending the alert to one or more of a vehicle driver, a remote platform, or the vehicle electronic control unit, ECU. The alert may indicate one or more of the following: an indication recorded measurement data represents a sub-optimal recording angle, a low measurement data accuracy alert message, a measured dimension deviates beyond a predetermined value, an indication of an obstruction affecting image analysis of one or more dimensions, an indication to repeat the measurement of one or more of the trailer dimensions, an indication to reposition the vehicle prior to performing a trailer dimension measurement, a data quantity measurement warning for low levels of measurement data, and/or an indication of one or more measured dimensions or the configuration of the trailer deviating from predetermined dimensional measurement data or configuration data for that trailer.

In some embodiments, the method may further comprise adding one or more safety margins to the measured trailer dimensions. A safety margin for a measured trailer dimension may be predetermined or adjusted dynamically, for example, a safety margin may be dynamically determined based on the determined accuracy of the measurement data for that measured trailer dimension.

Figure 3B:
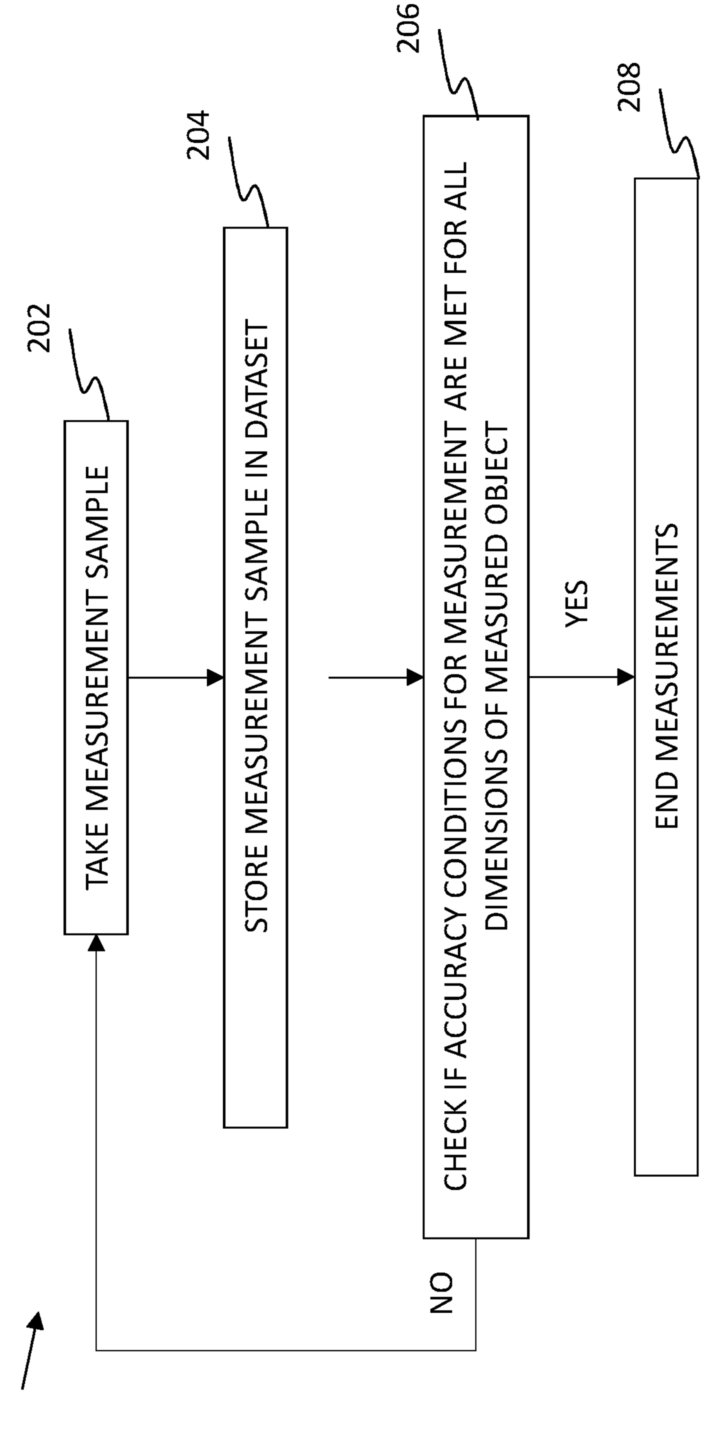
FIG. 3B shows schematically an example embodiment of the method of FIG. 3A.

FIG. 3B shows an example embodiment of the disclosed technology in which measurement accuracy is continuously determined by the sensor system of the vehicle measuring the trailer dimensions. So, instead of just taking sample heights h1, h2, h3 for example, at different points X1, X2, X3 along the trajectory 12, vehicle 10 continuously takes samples of height h1 for as long as it can obtain relevant sensor data for their dimensional length and it may take measures of h1 at the same time as taking a measurement of height h2 or another dimensional length of the trailer, depending on its approach trajectory and the orientation of the vehicle). In other words, vehicle 10 continuously takes measurements of all measureable dimensional lengths of an object it is detecting in some embodiments of the disclosed technology.

As shown in FIG. 3B, a vehicle is assumed to have sensed an object to be measured and then starts to perform the method illustrated schematically in FIG. 3B to take measurement samples. For example, a vehicle uses its sensors to detect an object and to take measurements, shown as measurement samples, step 202, in each of the dimensional lengths, where a dimensional length may be a height, width or depth of the sensed object. Each measurement taken by the vehicle is then stored as a measurement sample, step 204, in a memory dataset.

The ADS (or ADAS) of the vehicle is configured to then check the fulfilment of specified thresholds of the accuracy of the measurement, in other words, the ADS (or ADAS) then checks if the accuracy conditions for measurement in each dimensional length are met, step 206, for all three dimensions of the measured object.

Optionally, in some embodiments, the vehicle ADS (or ADAS) also determines if enough data has been collected by also analysing if enough of the object being measured. In other words, by way of example, if the object being measured is a trailer, the ADS (or ADAS) may determine if the trailer has been sufficiently "seen" in other words sensed by the vehicle on its trajectory around/approaching the trailer. This may involve, for example, the method 100, 200 further comprising: analysing if enough of each side area has been in the field of view of the sensor. Optionally, in some embodiments, the ADS (or ADAS) may, based on the object to be measured, analyse which measurements are missing from the dataset to fulfil the specified accuracy thresholds. For example if one of the dimensions (e.g. b3, b4) of the object has not been viewed properly during the continuous measurement or similar.

Optionally, in some embodiments, where the ADS comprises an ADAS, the ADS will cause a display or otherwise provide and/or present information, for example, in the form of an audible guide, for an operator of the vehicle to position the sensor system to get the data to fulfil the accuracy thresholds. If the accuracy conditions are met in step 206, in other words, If the accuracy thresholds for all lengths are fulfilled, the vehicle ends taking measurements, step 208. Otherwise the measurements are continuously taken and the method continues with step 202.

The accuracy of the measurements can be defined in any suitable way. For example, it may be defined based on the variance of each dimensional length, calculated from the measured dataset in some embodiments. Alternatively, the accuracy of measurements may be defined based on the variance of each dimensional length, calculated from the measured dataset where each sample points is weighed against the viewing angle/area of each trailer side is associated with. The target threshold of the accuracy can be variable in some embodiments and set by each function using the dimensional data. This allows the accuracy required of the dimensional measurements of an object to differ between field of usage.

In some embodiments, instead of measuring an object, the measurements may be of a gap, for example, the vehicle's sensors may measure a gap or width, or the height of a gap.

Figure 4:
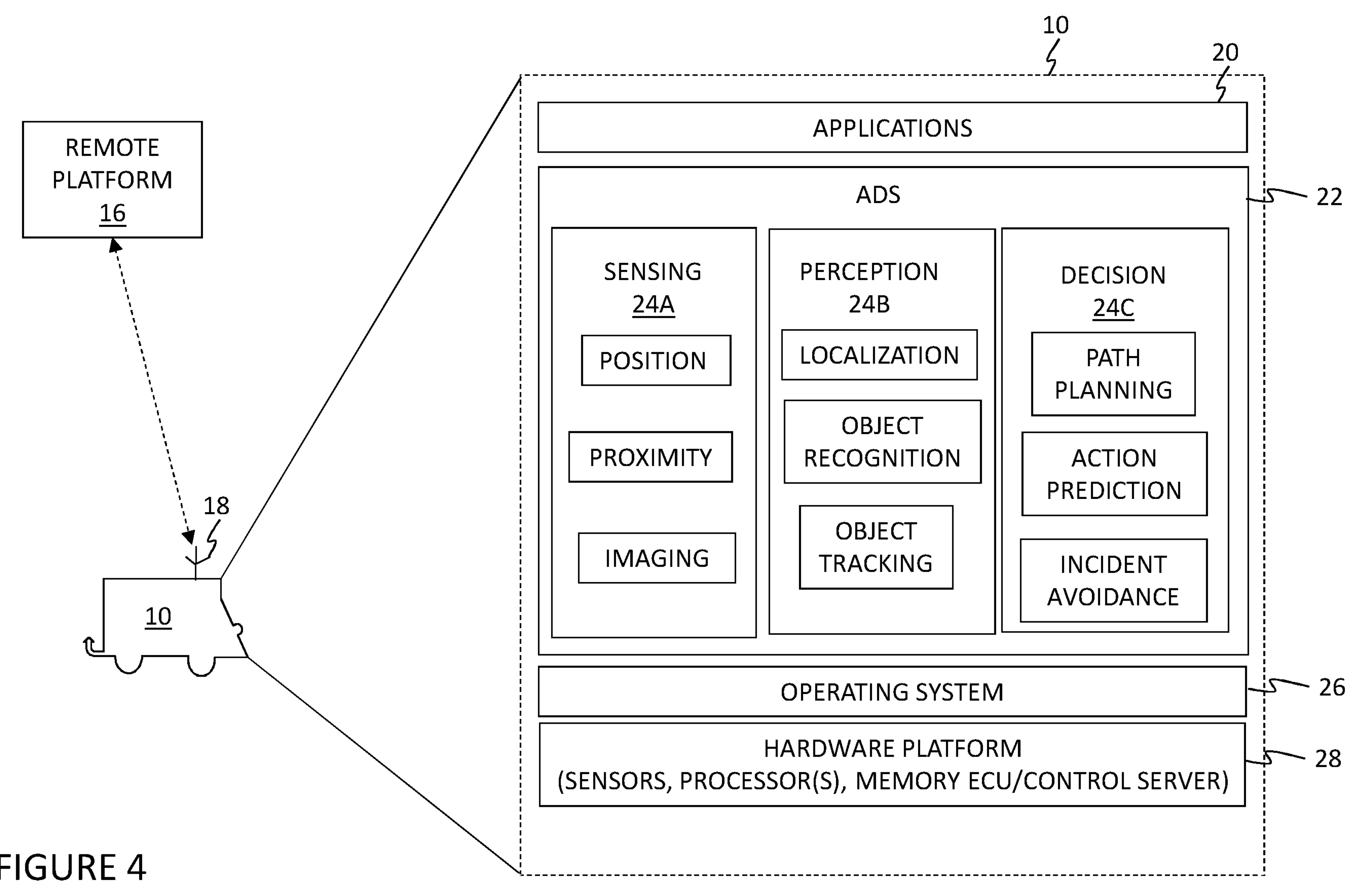
FIG. 4 schematically illustrates a vehicle configured to implement a method of measuring dimensions of a three-dimensional object such as a trailer according to some embodiments of the disclosed technology.

FIG. 4 of the accompanying drawings shows schematically vehicle 10 which may perform an embodiment of the methods 100, 200 disclosed herein. As shown schematically on the left hand side of in FIG. 4, the vehicle 10 is an automated vehicle which is provided with suitable communication system including at least one antenna 18 to communicate using a wireless communications system with a remote platform 16, for example, a site office or fleet server or the like, or another server or source of information, for example, to receive positioning data such as GPS data or the like, however, having an antenna and/or communications system is optional in some embodiments.

The right-hand side of FIG. 4 shows schematically examples of some of the internal components of the vehicle 10. It will be apparent to anyone of ordinary skill in the art that some components of the vehicle 10 have been omitted for clarity, such as the vehicle chassis etc. As shown in FIG. 4, the vehicle 10 includes at least one application 20 which comprises computer-program code which when loaded from memory and executed by one or more processors of the vehicle causes the vehicle to perform an embodiment of one or both of the disclosed methods 100, 200.

Also shown schematically is a vehicle automated driving system, ADS, 22 which includes a sensing system 24A having imaging sensors such as cameras as well as sensors configured to sense the position and proximity of objects in the vicinity of the vehicle 10. The ADS 22 also includes a perception system 24B for object localization, recognition, and tracking, and a decision system 24C which performs functions related to path planning, action prediction and incident avoidance. The one or more applications 20 and/or ADS 22 run in the vehicles operating system 26 and use the vehicle hardware 28 which includes the sensors, processors, electronic control unit/control server of the vehicle.

Figure 5:
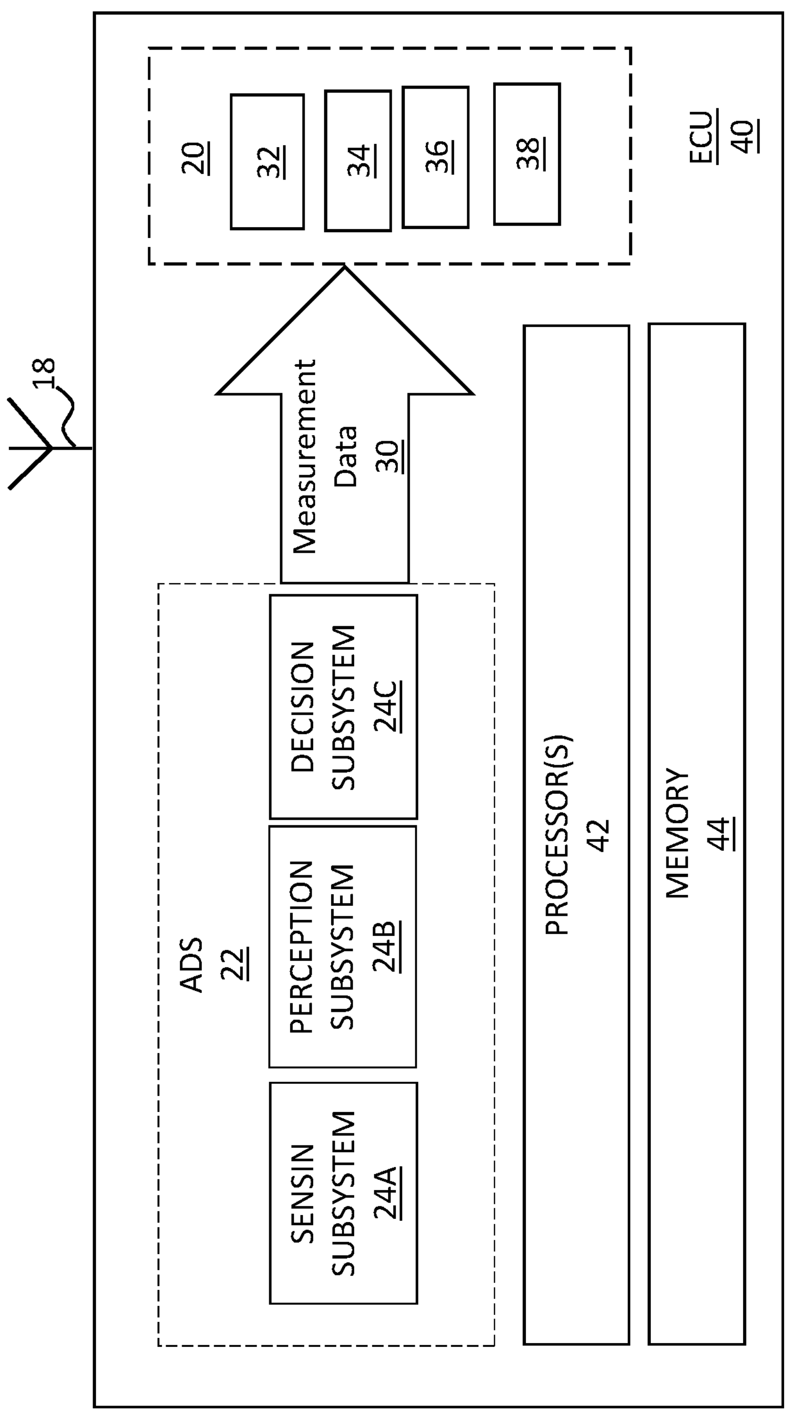
FIG. 5 schematically illustrates an ADS providing measurement data to an application configured to implement a method of measuring dimensions of an object such as a trailer according to some of the disclosed embodiments.

FIG. 5 of the accompanying drawings shows schematically how the ADS 22 may provide measurement data 30 to the application 20 configured to implement an embodiment of a method 100, 200 which measures one or more dimensions of an object such as a trailer in a manner which optimizes measurement accuracy.

As shown in FIG. 5, the application 20 comprises computer-program code or circuitry which, when loaded from memory 44 and executed by one or more processors or processing circuitry 42 is configured to implement a method of measuring object, for example, trailer, dimensions such as at least one of a trailer length, height, and width, using a vehicle, such as one of the embodiments of method 100 or 200 disclosed herein and described with respect to the accompanying drawings. The computer-program code comprises a module or circuitry 32 configured to identify a trailer to be measured, a module or circuitry 34 configured to generate measurement data by repeatedly measuring one or more dimensions of the identified trailer using a set of one or more sensors of the vehicle, a module or circuitry 36 configured to evaluate the accuracy of the measurement data based on a view angle at which each measurement was captured by the vehicle, and computer code or circuitry 38 configured to determine a subset of the measurements based on their evaluated accuracy to represent the trailer dimensions. In some embodiments of the disclosed technology, the modules of the application configured to implement an embodiment of the disclosed method of optimizing measurements of an object by a vehicle may be adapted or additional modules may be provided to implement one or more of the embodiments or optional features of the method disclosed herein.

In some embodiments, a non-transitory storage medium comprises computer program code which, when loaded by one or more processors 42 of a vehicle for execution, causes the vehicle to perform a method according to any of the embodiments of the first aspect.

The disclosed methods 100, 200 may be performed by a vehicle to optimize measurement accuracy as the vehicle approaches a trailer and captures data using its front facing sensors which is then processed by the vehicle's ADS (or ADAS) to estimate the trailer dimensions. The methods 100, 200 may be performed in a variety of use contexts and provide various technical benefits. For example, optimizing trailer dimensionality measurements allows a vehicle to assess the configuration and pose of a trailer for accurately for example prior to attempting to couple with the trailer. The trailer dimensionality may be used to facilitate the coupling. Other possible use cases of the trailer dimensionality measurements includes assessing the suitability of the vehicle for hauling the trailer and/or to assess if the trailer dimensions affect any route planning.

For all of the above use contexts, the use of the disclosed methods may optimize the accuracy of the measurements taken by the vehicle to allow trailer configuration and/or pose information to be obtained by the vehicle with more reliable accuracy.

In some embodiments, use of the method allows measurements which are not sufficiently accurate (for a likely intended use context) to be flagged, for example, by providing a warning message. Based on the information in the warning message, a human operator and/or the ADS (or ADAS), of the vehicle may be capable of retaking the measurements more quickly than if such a warning message was not provided. This is beneficial in particular for automated vehicles which are configured to couple with a trailer as it reduces the likelihood of the coupling manoeuvre failing, and so allows for faster hitching of a vehicle to a trailer or similar object to be towed by the vehicle. It also allows for better route planning as if the trailer size, for example, its height, is more accurately known, then a smaller margin of error can be used when route planning which may allow for routes which might other words not be available to be followed as well as allowing, for example, a high-sided trailer to avoid being taken on a route where there are no low overhead obstructions etc.

The ADS (or ADAS) 22 of the vehicle 10 shown in FIG. 5 is configured to tactical decisions for the vehicles control system, also referred to herein as the electronic control unit, ECU 40, of the vehicle 10. As shown in FIG. 5, the ADS (or ADAS) 22 is shown sharing resources such as memory and processors used by the vehicle ECU 40. In some embodiments, however, a vehicle 10 may be provided with an ADS (or ADAS) 22 which may use one or more resources of the vehicle such as memory 44 and/or processors or processing circuitry 42 which are separate from the resources used by the ECU.

The vehicle 10 may be a heavy-duty vehicle in some embodiments. A heavy-duty vehicle may comprise a wide range of different physical devices, such as combustion engines, electric machines, friction brakes, regenerative brakes, shock absorbers, air bellows, and power steering pumps. These physical devices are commonly known as Motion Support Devices (MSD). The MSDs may be individually controllable, for instance such that friction brakes may be applied at one wheel, i.e., a negative torque, while another wheel on the vehicle, perhaps even on the same wheel axle, is simultaneously used to generate a positive torque by means of an electric machine. The automated or autonomous operation of a heavy-duty vehicle is accordingly more complex than the automated or autonomous operation of a more light-weight vehicle such as a car.

Some, if not all, of the above embodiments may be implemented using computer program code which may be provided as software or hardcoded, for example, as a computer program product configured to be used by a device mounted on or integrated in a vehicle. In some embodiments, the computer program product comprises computer-code which when executed by one or more processors of the vehicle, causes the vehicle to implement a method for measuring trailer dimensions using a vehicle according to any one of the disclosed embodiments.

For example, the methods 100, 200 described herein may be performed by a vehicle 10 having an ADS 22, which may also be an ADAS in some embodiments, configured to perform method 100, 200 at least partly using one or more processors, such as, the processors or processing circuitry 42 in a vehicle control system, such as that shown schematically as ECU 40 in FIG. 5 together with computer program code for performing the functions and actions of the embodiments disclosed herein. In some embodiments of the disclosed technology the vehicle 10 is a heavy-duty automated vehicle configured to perform a method 100, 200 of measuring trailer dimensions whilst the vehicle is moving along a trailer coupling approach trajectory to the trailer Some embodiments of the disclosed technology accordingly comprise a control system or circuitry, such as ECU 40, for a vehicle 10 having an automated driving system, ADS 22 (or an ADAS) the control system or circuitry 40 comprising memory 44, one or more processors or processing circuitry 42, and computer-program code which, when loaded from memory 44 and executed by the one or more processors or processing circuitry 42 causes the control system 40 to implement a method 100 or 200 as disclosed herein.

The program code mentioned above may also be provided as a computer program product, for instance in the form of a data carrier carrying computer program code or code means for performing the embodiments herein when being loaded into the processing circuitry 42 in the ECU 40.

The data carrier, or computer readable medium, may be one of an electronic signal, optical signal, radio signal or computer-readable storage medium. The computer program code may e.g. be provided as pure program code in the ECU 40 or on a server and downloaded to the ECU 40. Thus, it should be noted that the functions of the EC 40 may in some embodiments be implemented as computer programs stored in memory 44, for example, a computer readable storage unit, for execution by processors or processing modules, e.g. the processing circuitry 42 of the ECU 40 of FIG. 5.

Those skilled in the art will also appreciate that the processing circuitry 42 and the memory or computer readable storage unit 44 described above may refer to a combination of analog and digital circuits, and/or one or more processors configured with software and/or firmware, e.g. stored in a memory, that when executed by the one or more processors such as the processing circuitry 44 perform a method of measuring object, for example, trailer, dimensions as disclosed herein. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The ECU 40 also comprises or is capable of controlling how signals are sent wirelessly via vehicle antenna 18 in order for the vehicle 10 to communicate via one or more communications channels with remote entities, for example, a site back office.

The communication channels may be point-to-point, or networks, for example, over cellular or satellite networks which support wireless communications. The wireless communications may conform to one or more public or proprietary communications standards, protocols and/or technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The operating system 26 of the vehicle 10 may further various software components and/or drivers for controlling and managing general system tasks (e.g., memory management, storage device control, power management, etc.) and facilitates communication between various hardware and software components.

Where the disclosed technology is described with reference to drawings in the form of block diagrams and/or flowcharts, it is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

The description of the example embodiments provided herein have been presented for the purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements, features, functions, or steps than those listed and the words "a" or "an" preceding an element do not exclude the presence of a plurality of such elements, features, functions, or steps. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of methods, and may refer to elements, functions, steps or processes, one or more or all of which may be implemented in one aspect by a computer program product, embodied in a computer-readable medium, including computer-executable instructions, such as program code, executed by computers in networked environments.

A computer-readable medium may include removable and non-removable storage devices including, but not limited to, Read Only Memory (ROM), Random Access Memory, RAM), which may be static RAM, SRAM, or dynamic RAM, DRAM. ROM may be programmable ROM, PROM, or EPROM, erasable programmable ROM, or electrically erasable programmable ROM, EEPROM. Suitable storage components for memory may be integrated as chips into a printed circuit board or other substrate connected with one or more processors or processing modules, or provided as removable components, for example, by flash memory (also known as USB sticks), compact discs (CDs), digital versatile discs (DVD), and any other suitable forms of memory. Unless not suitable for the application at hand, memory may also be distributed over a various forms of memory and storage components, and may be provided remotely on a server or servers, such as may be provided by a cloud-based storage solution. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The memory used by any apparatus whatever its form of electronic apparatus described herein accordingly comprise any suitable device readable and/or writeable medium, examples of which include, but are not limited to: any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry. Memory may store any suitable instructions, data or information, including a computer program, software, an application including one or more of logic, rules, code, tables, etc. and/or other instructions capable of being executed by processing circuitry and, utilized by the apparatus in whatever form of electronic apparatus. Memory may be used to store any calculations made by processing circuitry and/or any data received via a user or communications or other type of data interface. In some embodiments, processing circuitry and memory are integrated. Memory may be also dispersed amongst one or more system or apparatus components. For example, memory may comprise a plurality of different memory modules, including modules located on other network nodes in some embodiments.

The above disclosure describes various embodiments relating to a method of measuring trailer dimensions using a vehicle, the method comprising generating measurement data by repeatedly measuring one or more dimensions of a vehicle accessory, for example, a trailer or another type of object, which the vehicle is to interact with, for example, by coupling with the object or picking it up or moving it. The method uses a set of one or more sensors of the vehicle to obtain the measurement data and also to evaluate the accuracy of the measurement data based on the angle of observational also referred to herein as the observational view angle or view at which each measurement was captured by the vehicle, taking into account the angle of perspective of the measurement point of the object. The method determines a subset of the measurements based on their evaluated accuracy to represent the trailer dimensions.

In the drawings and specification, there have been disclosed exemplary aspects of the disclosure. However, many variations and modifications can be made to these aspects which fall within the scope of the accompanying claims. Thus, the disclosure should be regarded as illustrative rather than restrictive in terms of supporting the claim scope which is not to be limited to the particular examples of the aspects and embodiments described above. The invention which is exemplified herein by the various aspects and embodiments described above has a scope which is defined by the following claims.

The invention claimed is:

1. A method of measuring trailer dimensions using a vehicle, the method comprising:

generating measurement data by repeatedly measuring one or more dimensions of a detected trailer using a set of one or more sensors of the vehicle, the measurement data comprising a plurality of measurement samples based on one or more sensor data streams at different view angles as the vehicle moves relative to the detected trailer;

evaluating the accuracy of the measurement data by computing, for each measurement sample of the plurality of measurement samples, an angle data quality condition based on a view angle at which the each measurement sample was captured by the vehicle, the angle data quality condition representing a quality value associated with deviation of the view angle from a reference measurement angle;

determining a dimension estimate by calculating a weighted mean of measurement values for the one or more dimensions, each measurement value being weighted by its corresponding angle data quality condition; and determining a subset of the measurements based on their evaluated accuracy to represent the trailer dimensions.

2. The method of claim 1, wherein the vehicle is an autonomous or semi-autonomous vehicle, the trailer is a trailer identified by the vehicle as a trailer to be coupled with, and the method is performed when the vehicle is on a trailer coupling approach trajectory.

3. The method of claim 1, wherein the vehicle is an autonomous self-driving vehicle, and in response to the autonomous self-driving vehicle receiving an identifier for the trailer to be measured by the vehicle, the autonomous self-driving vehicle performs the method autonomously.

4. The method of claim 1, wherein, in response to the vehicle receiving an identifier for the trailer to be measured, the method further comprises causing measurement guidance to be provided to a driver of the vehicle to measure the identified trailer using the vehicle.

5. The method of claim 1, wherein the measuring is performed using LIDAR or a combination of LIDAR and one or more of the following types of sensor systems on board the vehicle:

a camera system;

a RADAR system; and an ultrasound system.

6. The method of claim 1, wherein all sides of the trailer are measured.

7. The method of claim 1, wherein the method further comprises the vehicle, responsive to completing a measurement of a dimension of the trailer, performing at least one of:

causing presentation of a measurement accuracy of the measurement data on a display;

sending data representing a measurement accuracy of the measurement data to a remote platform; and sending data representing a measurement accuracy of the measurement data to an electronic control unit onboard the vehicle.

8. The method of claim 1, wherein if the measurement accuracy of the measurement is below a threshold, the method repeats at least the measuring, evaluating, determining of claim 1 until the measurement accuracy of the measurement data meets a threshold measurement accuracy condition.

9. The method of claim 8, wherein the vehicle is an autonomous vehicle, and the vehicle travels around the trailer until the measurement accuracy of the measurement data meets the threshold measurement accuracy condition or a measurement termination condition is met.

10. The method of claim 1, wherein evaluating the accuracy of the measurement data of a dimension of the trailer is performed by:

determining a first perspective view angle at which first measurement data of a dimension (D1) of the trailer is obtained;

determining a second perspective view angle at which second measurement data of the dimension (D1) of the trailer is obtained; and determining a median or mean measurement data value for the length of the dimension D1 within an angle range between the first and second perspective view angles, wherein, based on the median or mean measurement data, a representative trailer length measurement in dimension D1 is obtained by predicting a maximum value of the median or mean trailer length dimension D1 at a predicted max perspective view angle, wherein the predicted max perspective view angle is selected by minimizing a deviation from ninety degrees.

11. The method of claim 10, wherein the method further comprises generating an alert and sending the alert to one or more of a vehicle driver, a remote platform, or the vehicle electronic control unit, ECU, indicating one or more of the following:

an indication recorded measurement data represents a sub-optimal recording angle;

a low measurement data accuracy alert message;

a measured dimension deviates beyond a predetermined value;

an indication of an obstruction affecting image analysis of one or more dimensions;

an indication to repeat the measurement of one or more of the trailer dimensions;

an indication to reposition the vehicle prior to performing a trailer dimension measurement;

a data quantity measurement warning for low levels of measurement data;

an indication of one or more measured dimensions or the configuration of the trailer deviating from predetermined dimensional measurement data or configuration data for that trailer.

12. The method of claim 1, wherein the method further comprise adding one or more safety margins to the measured trailer dimensions.

13. The method of claim 1, wherein the method further comprise adding one or more safety margins to the measured trailer dimensions and wherein a safety margin for a measured trailer dimension is dynamically determined based on the determined accuracy of the measurement data for that measured trailer dimension.

14. A control system or circuitry for a vehicle having an automated driving system or an advanced driver assistance system the control system or circuitry comprising:

memory;

one or more processors or processing circuitry; and computer-program code which, when loaded from memory and executed by the one or more processors or processing circuitry causes the control system to implement a method of measuring trailer dimensions using a vehicle, the method comprising:

generating measurement data by repeatedly measuring one or more dimensions of a detected trailer using a set of one or more sensors of the vehicle, the measurement data comprising a plurality of measurement samples based on one or more sensor data streams at different view angles as the vehicle moves relative to the detected trailer;

evaluating the accuracy of the measurement data by computing, for each measurement sample of the plurality of measurement samples, an angle data quality condition based on a view angle at which the each measurement sample was captured by the vehicle, the angle data quality condition representing a quality value associated with deviation of the view angle from a reference measurement angle;

determining a dimension estimate by calculating a weighted mean of measurement values for the one or more dimensions, each measurement value being weighted by its corresponding angle data quality condition; and determining a subset of the measurements based on their evaluated accuracy to represent the trailer dimensions.

15. The control system or circuitry of claim 14, wherein the vehicle is an autonomous or semi-autonomous vehicle, the trailer is a trailer identified by the vehicle as a trailer to be coupled with, and the control system is caused to implement the method when the vehicle is on a trailer coupling approach trajectory.

16. An automated vehicle comprising a control system or circuitry according to claim 14.

17. The automated vehicle of claim 16, wherein the automated vehicle is a heavy-duty automated vehicle configured to perform a method of measuring trailer dimensions whilst the vehicle is moving along a trailer coupling approach trajectory to the trailer, the method comprising the vehicle:

generating measurement data by repeatedly measuring one or more dimensions of a detected trailer using a set of one or more sensors of the vehicle;

evaluating the accuracy of the measurement data based on a view angle at which each measurement was captured by the vehicle; and determining a subset of the measurements based on their evaluated accuracy to represent the trailer dimensions.

18. A non-transitory computer program product comprising computer-code which when loaded from memory and executed by one or more processors or processing circuitry of a control system or control circuitry of a vehicle having an automated driving system, causes the vehicle to implement a method of measuring trailer dimensions using a vehicle, the method comprising:

generating measurement data by repeatedly measuring one or more dimensions of a detected trailer using a set of one or more sensors of the vehicle, the measurement data comprising a plurality of measurement samples based on one or more sensor data streams at different view angles as the vehicle moves relative to the detected trailer;

evaluating the accuracy of the measurement data by computing, for each measurement sample of the plurality of measurement samples, an angle data quality condition based on a view angle at which the each measurement sample was captured by the vehicle, the angle data quality condition representing a quality value associated with deviation of the view angle from a reference measurement angle;

determining a dimension estimate by calculating a weighted mean of measurement values for the one or more dimensions, each measurement value being weighted by its corresponding angle data quality condition; and determining a subset of the measurements based on their evaluated accuracy to represent the trailer dimensions.

* * * * *